April 26, 1966  R. M. SCHIRMER ETAL  3,248,252
PROCESS FOR PRODUCING ACIDIC CARBON BLACK
Filed May 18, 1962  3 Sheets-Sheet 1

INVENTORS
R.M. SCHIRMER
M.M. JOHNSON
BY
*Young & Rugg*
ATTORNEYS

INVENTORS.
R. M. SCHIRMER
M. M. JOHNSON
ATTORNEYS

United States Patent Office  3,248,252
Patented Apr. 26, 1966

3,248,252
PROCESS FOR PRODUCING ACIDIC
CARBON BLACK
Robert M. Schirmer and Marvin M. Johnson, Bartlesville, Okla., assignors to Phillips Petroleum Company, a corporation of Delaware
Filed May 18, 1962, Ser. No. 195,767
16 Claims. (Cl. 106—307)

This invention relates to the production of carbon black. In one aspect, it relates to a process for continuously producing a relatively low pH furnace carbon black. In another aspect, it relates to apparatus for producing relatively low pH furnace carbon black. In another aspect, it relates to controlling the acidity of an oil furnace carbon black. In another aspect, it relates to an improved low pH carbon black. In another aspect, it relates to compensating for variations in hydrocarbon raw materials which normally would significantly affect the quality of carbon black produced therefrom, by the addition of sulfur thereto.

When carbon black first became important in compounding rubber, the major portion of the total carbon black produced was manufactured by the channel process wherein natural gas was burned in a deficiency of oxygen and the resultant flame caused to impinge upon a cool surface to deposit the carbon formed thereupon. Channel blacks produced by this and other similar processes are characterized by low pH values and are well suited for some specific applications in compounding rubber. However, the methods of producing channel black are undesirably inefficient and require extensive equipment.

For these and other reasons, the furnace process has come into prominence and widespread usage for making carbon black using gas and/or liquid hydrocarbon feed and makes possible the production of large quantities of carbon black at high yields. The properties of this type of carbon black are superior to channel blacks for some uses, but inferior for certain other uses. Furnace blacks are usually characterized by an alkaline pH, greater than 7, while channel blacks have an acid pH, usually less than 6.

An object of our invention is to produce acidic carbon black.

Another object is to produce acidic oil furnace carbon black in a continuous process.

Another object is to control the acidity of oil furnace carbon black.

Another object is to produce improved low pH carbon black.

Another object is to compensate for variations in hydrocarbon raw materials which otherwise would significantly affect the quality of the black.

Other aspects, objects and advantages of our invention are apparent in the written description, the drawing and the claims.

It has been established that carbon blacks can be benefitted in one way or another by treating them at elevated temperatures in the presence of oxygen. Such treatment is believed to add reactive complexes to a greater or lesser extent to the carbon black surface, which frequently effects a reduction in pH of the black. Such surface oxidation can be carried out with both channel and furnace blacks but is particularly advantageous when performed on oil furnace blacks. Carbon blacks which have been so treated and which have been decreased in pH exhibit greater utility as rubber reinforcement and as pigments. By the practice of our invention oil furnace blacks are produced having pH values in the range of that for channel blacks, that is, having pH values less than 6. Throughout this application, when pH values of black are referred to, the pH of a suspension of carbon black and water, determined by the method of ASTM D512–60 is meant.

According to our invention, the pH of carbon black produced by thermal decomposition or dissociation of a fluid hydrocarbon raw material followed by subsequent oxidation, is controlled by continuously introducing at a controlled rate into the reaction zone, a substance comprising sulfur in amounts sufficient to provide at least 0.1 part by weight of sulfur per 100 parts by weight of the hydrocarbon reactant.

Further, according to the invention, there is provided improved carbon black producing apparatus including means to determine the sulfur content of the reactant continuously and to maintain the sulfur content of the reactant at a predetermined value responsive to the determined value.

Further according to our invention, there is provided an improved low pH furnace carbon black produced by decomposing a hydrocarbon reactant to form carbon black in the presence of a sulfur-containing compound followed by partial quench and oxidation.

We have discovered that the sulfur present in the carbon black reactor zone is a critical factor when the resulting carbon black is after treated with oxygen. It has been found that when the reaction is essentially devoid of sulfur, oxidative treatment does not result in substantial pH reduction. The introduction of sulfur in amounts corresponding to at least about 0.1, especially about 0.1 to about 3.0 and preferably from about 0.5 to about 1.5 parts by weight (calculated as elemental sulfur) per 100 parts by weight of hydrocarbon feedstock is necessary to produce a satisfactorily pH reduction in the after treated black. Sulfur contents greater than 3.0 percent are operable but no great advantage is seen in exceeding this value.

It is well known that many carbon black feedstocks naturally contain sulfur in this order of magnitude. An $SO_2$ extract oil, for example, which is a heavily aromatic fraction of heavy cycle oil, is routinely used as a raw material for carbon black and frequently contains sulfur. Our invention is directed to the production of carbon black while closely controlling the amount of sulfur present in the reaction zone. Where the feedstock contains relatively small amounts of sulfur or is substantially sulfur-free, relatively large amounts of additional sulfur must be added while, when the feedstock contains relatively large amounts of sulfur, relatively small amounts need be added. There may be times when the amount of sulfur present in the feedstock is equal to or greater than the amount needed for the desired effect. When this occurs, no sulfur is added and the feedstock can be diluted with a low sulfur, diluent feedstock to produce the desired total sulfur content. The important consideration is that the correct amount of sulfur be introduced into the reaction zone at all times for the desired effect on pH, to avoid variations in the effect.

Any sulfur compound which is compatible with and readily dispersed in the oil feed may be used. Some examples are carbon disulfide; hydrogen sulfide; mercaptans such as ethyl mercaptan, tert-butyl mercaptan, n-heptyl mercaptan, myricyl mercaptan, phenyl mercaptan, and o-xylene dimercaptan; thioethers (alkyl sulfides) such as ethyl sulfide, propyl sulfide, butyl sulfide, methyl ethyl sulfide, methylisopropyl sulfide; thiophenes such as thiophenes; 2-methylthiophene, 2,3-dimethylthiophene, 2-ethylthiophene; thiophanes such as hexylthiophane, octylthiophane, iso-octylthiophane, undecylthiophane; octadecylthiophane organic disulfides such as ethyl disulfide, butyl disulfide, methyl isobutyl disulfide; and polysulfides such as Thiokol.

This invention is applicable to any furnace carbon black process which employs oxidative after treatment. For example, it may be applied with some advantage to the carbon black air oxidation process described in U.S. 2,682,448 of M. R. Cines (assigned to Phillips Petroleum Company) as well as to the process of Cines and Krejci described in U.S. 2,714,055. It is especially well suited to the continuous carbon black preparation and oxidation process described herein.

Preferably the pressure in the reaction and oxidizing zones in the process of our invention is maintained in the range of 8–30 atmospheres. Heat is added in the reaction zone to maintain a temperature in the range of 2000–3300° F. The temperature of the products after the partial quench is in the range of 800–1800° F., preferably in the range of 1200–1500° F. For best results, the temperature of the partially quenched product should be from approximately the ignition temperature of the product to 300° F. below the ignition temperature. The residence time in the reactor is in the range of about 5 to about 40 milliseconds, while the residence time in the oxidizer preferably is in the range of 13 to 50 milliseconds. The pressure in the reactor is controlled by metering the gas flow out of the system, while the residence time is controlled by metering the air into the system. The temperature is controlled in critical zones by the amount of quenching liquid added.

In the drawing, FIGURE 1 is a schematic elevation, partially in cross-section, of apparatus comprising a carbon black reactor and a carbon black oxidizer.

Figure 1:
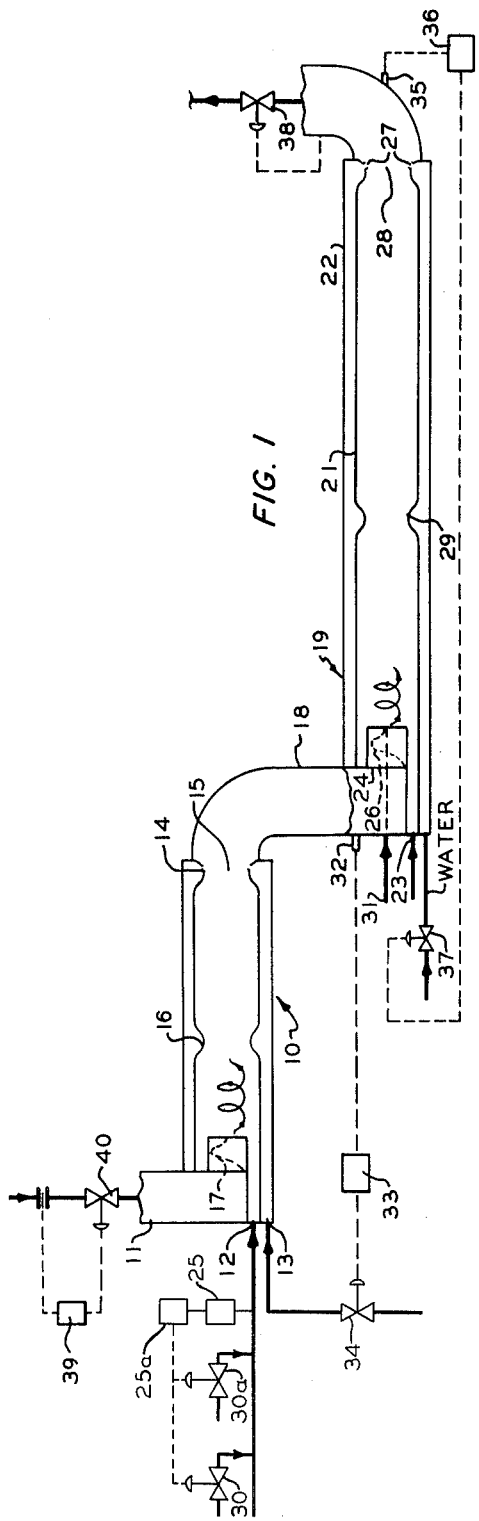

In the apparatus of FIGURE 1, a reactor 10 is provided with an oxidant inlet 11, a hydrocarbon inlet 12, and a quench fluid inlet 13 near one end, and a quench injection ports 14 and an outlet 15 at the other end. Preferably reactor 10 is provided with a restriction 16 at a mid-point. A hydrocarbon is injected annularly into reactor 10 and proceeds longitudinally along the cylindrical wall thereof, while air is injected through inlet 11 and, through the influence of vanes 17, enters the reaction space as a swirling axial core. Additional mixing of the hydrocarbon and the air occurs as the stream passes restriction 16 (if provided) and the reaction continues in more turbulent conditions through the remainder of the reactor. Sufficient quench liquid, preferably water, is injected through ports 14 to lower the temperature of the reaction products sufficiently to stop the production of carbon black. The reaction products then proceed through conduit 18 to oxidizer 19.

Oxidizer 19 comprises an inner, generally cylindrical shell 21, and an outer generally cylindrical shell 22, an annular inlet 23 for oxidant, an axial inlet 24 provided with vanes 26, quench injection ports 27 and outlet 28. The partially quenched reaction products pass through conduit 18 and enter oxidizer 19 through axial inlet 24 and are given a swirling motion by vanes 26. Additional oxidant, preferably air, enters annularly through inlet 23. Thus, the air is flowing horizontally along the wall of the chamber while the reaction products spiral through the chamber as a rotating core within the annulus of air. The oxidation is effected at the highly turbulent shear interface between the fuel, and the air, and therefore the carbon black is oxidized near the periphery of the reactor wall, in the mixing zone at the interface. Preferably, a restriction 29 is provided and at this point the reaction mixture is forced into increased turbulence and the oxidation is completed in the succeeding portion of the chamber. Quench liquid, preferably cooling water, enters the jacket formed between outer shell 22 and inner shell 21, cools the wall of inner shell 21, and is metered through quench injection port 27 to stop the oxidation. If desired, quench water also can be added through a pipe 31 to augment or replace the partial quench added in quench injection ports 14. The effluent from the oxidizer, containing the carbon black product, quench stream and reaction byproducts, leaves at outlet 28, proceeds through a pressure control valve 38 and through conventional separation, bagging and venting units (not shown).

Suitable control means can be provided. For example, the temperature of the partially quenched stream can be controlled by means of a temperature probe 32 and a controller 33 regulating the flow of quench fluid by means of motor valve 34. Similarly, the temperature of the discharge stream can be controlled by temperature probe 35, controller 36, and motor valve 37. The pressure in the system can be controlled by a back pressure valve 38. The residence time can be controlled by a flow controller 39 regulating valve 40 in the air inlet line. If desired, the reactants can be fed as an automatically controlled ratio of the air.

To control the amount of sulfur introduced into reactor 10, the amount of sulfur present in the feedstock is controlled by continuously analyzing the feedstock for sulfur by analyzer 25 and controlling the addition of a sulfur compound through control valve 30 and the addition of a low sulfur feedstock through control valve 30a by means of controller 25a.

Preferably reactor 10 is made according to the disclosure in the copending application Serial No. 195,764, filed May 18, 1962, of R. M. Schirmer and E. H. Fromm and which is operated under superatmospheric pressure. However, more conventional furnace black reactors also can be used. For example, the refractory lined apparatus disclosed by Krejci in U.S. 2,616,795 can be utilized successfully.

The hydrocarbon fuel is carbonized in a reaction zone with a residence time of about 40 milliseconds at about 2800° F. It is then partially quenched with water to reduce the temperature to about 1500° F. and passed into a zone where contact with additional oxygen takes place with a residence time in that zone of about 30 milliseconds. The stream containing the low pH carbon black is then separated from volatile by-products and bagged in the conventional manner.

The hydrocarbon feed can be sprayed or atomized into the reactor by any conventional metering device and usually is preheated by any convenient means, such as gas-fired or electrical heat exchangers, to a temperature which is generally about 30–90 percent of the boiling point of the hydrocarbon. Under typical conditions a substantial portion of the hydrocarbon enters the first reaction zone in the vapor state. The hydrocarbon temperature can vary to a great extent, particularly with unusually low or high boiling fuels, the only essential requirement being that it arrives in an ignitable condition in the combustion zone. The flow rate varies with other conditions such as the size of the reactor, the reactor temperature, and the reactor pressure. With the apparatus of FIGURE 1 operating at 15 atm. and about 2800° F. and wherein reactor 10 was 1 foot long and 2 inches in diameter, the fuel rate varies from 50 to 300 lbs./hr.

Figure 3:
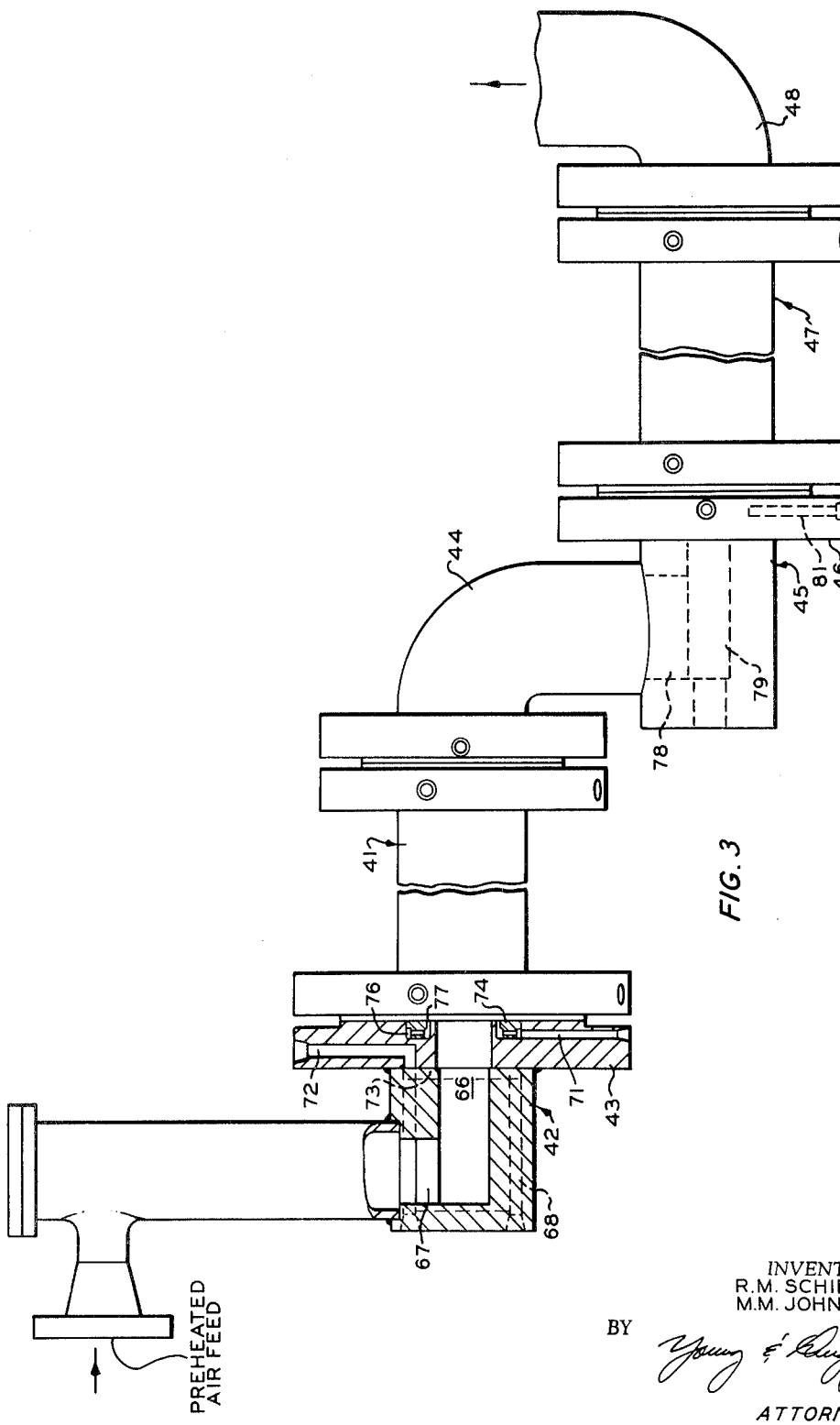
FIGURE 3 illustrates apparatus used to test our invention, including the reactor of FIGURE 2.

The reaction air can be pumped and preheated by any convenient means, such as a rotary pump and an electrical or gas-fired heat exchanger, to a temperature of about 700 to 2000° F. and preferably to about 1000 to 1200° F. The spirally rotating motion may be effected by the use of one or more tangentially located ports such as shown in FIGURE 3, or by the use of suitable louvers or vanes such as that used in the apparatus of FIGURE 1 which are capable of imparting the desirable air rotation within the carbonization reactor. The initial hydrocarbon/air ratio varies with operating conditions but will generally range from 0.4 to 1.6 and is usually about 0.8 to 1 lb. hydrocarbon/lb. $O_2$. Expressed in a slightly different manner, the hydrocarbon/air ratio for the production of carbon black according to our invention is in the range of 1.5 to 5 times stoichiometric, preferably 2 to 4 times. When the feedstock is paraffinic, the hydrocarbon/air ratios generally are lower; and conversely, when the feedstock contains appreciable amounts of aromatic hydrocarbons, the ratios are higher.

The temperature within the combustion and reaction zones of the process can be varied within wide limits. For example, the chamber temperature may range from 2000 to 3300° F. However, preferred reactor temperatures are from 2400 to 3000° F.

A constriction at a midpoint, that is an intermediate location, of the reactor has been found advantageous in many cases, but a smoothly cylindrical reaction zone without such a constriction is also satisfactory.

The rate of cooling water pumped into the reactor jacket depends upon the reaction temperature desired and varies widely. The jacket water is also metered into the core of the reactor at a point at the end of the primary reaction zone to partially quench the reaction. This primary quenching reduces the temperature of the reaction stream to a range of from about 800 to about 1800° F. At this temperature, the newly formed carbon black becomes less subject to excessive decomposition reactions but remains responsive to contact with the subsequent oxygen stream.

The partially quenched carbon-containing stream then is conducted to the oxidizing chamber where the carbon-containing stream is introduced axially and the oxidizing air flow is introduced into the annulus. While such an arrangement is preferred, it has been found that the oxidizing air can be introduced at the axis as through pipe 31 instead of at the annulus with similarly good results.

The temperature in the oxidizing zone as measured by the temperature of the carbon stream entering the oxidizing chamber has been found critical. Varying the inlet temperature varies the pH of the resulting carbon black product. The lowest pH is obtained at a temperature of about 1500° F. It is noted that this temperature is considerably higher than the oxidizing temperatures used in prior art methods. The ignition temperature of the carbon black, under the conditions of the invention process, appears to lie between 1500 and 1600° F. However, the relatively high oxidation temperature, the very short residence time and the composition of the carbon feed stream combine to produce a carbon black product which is particularly suitable for rubber reinforcement. While oxidation chamber residence times of about 0.030 second were employed, the residence time can be varied, depending upon other conditions from 0.005 second to as long as 0.4 second or even 1 second, and still obtain good quality high yield carbon black.

The over-all hydrocarbon/oxygen mix ratio for the invention process can range from about 0.20 to about 0.80 and is generally about 0.50 lbs. hydrocarbon/lb. oxygen.

The oxidizing zone is water cooled in a manner similar to that in which the primary reaction chamber is cooled. A portion of the jacket water is metered into the hot core at the end of the oxidation zone to complete the quenching and thus prevent excessive decomposition of product. Care must be taken to provide sufficient quenching fluid for this purpose and yet prevent excessive quench water usage which would interfere with subsequent carbon recovery operation. The condensation of water vapor in the product carbon is to be avoided. A by-pass valve is generally provided on the jacket water system so that the portion of the jacket water used to quench the carbon-containing stream can be rigidly controlled.

The effluent from the oxidation chamber of the invention process passes through a conventional pressure control valve beyond which the pressure is reduced to about atmospheric. The carbon is then separated from the stream, bagged, and the by-product and residual gases are vented. These latter operations are familiar to those skilled in the art.

While carbon black of some sort can be produced from any hydrocarbon, it has been found that the best carbon black for rubber reinforcement is one that has relatively small particle size.

To produce such small particle size grades of carbon black in high yield per pound of feedstock, it is preferable to employ a liquid hydrocarbon feedstock as the source of said carbon black. Said liquid hydrocarbon feedstock may be a petroleum distillate, or a petroleum residual oil, or a coal tar distillate, or a coal tar residual oil; it should have a substantial aromatic content, and may be fed in vapor form if substantially vaporizable, or as an atomized spray of droplets, into the furnace. With regard to the use of petroleum oils, the following aromatic streams from an oil refinery are used commercially: (1) recycle gas oil from catalytic or thermal cracking; (2) synthetic tars from catalytic or thermal cracking; (3) cracked residues; and (4) vacuum still overhead streams and tarry residuums, therefrom; or (5) aromatic streams recovered by solvent extraction of any of these streams (1) to (4).

From the standpoint of economics it is preferred to use liquid feedstocks having a U.S. Bureau of Mines correlation index (BMCI) of at least 80, preferably over 90 and more preferably over 110. The formula used is as follows:

$$BMCI = \left(\frac{876}{460+F} + \frac{670}{131.5+API} - 4.568\right)100$$

wherein "F" is the boiling point in °F. at the 50 percent recovery distillation point and "API" is the American Petroleum Institute gravity at 60° F. Also, from an economic standpoint the initial boiling point should be at least 170° F., preferably above 400° F. and most preferably above 550° F. It is preferred that the API gravity should be as low as possible, at least less than 25, preferably less than 10, most preferably 5 and below.

The best feedstock preferably has a low carbon residue and a low pentane insoluble content of less than 5 weight percent for petroleum oils and less than 10 weight percent for coal tars.

The oxygen and/or nitrogen content of the feedstock appears to only reduce the yield and not affect the quality.

The ash content should be low, generally below 0.5 weight percent, preferably below 0.2 weight percent, to keep the refractory in the carbon black furnace from fluxing, as the ash has little effect at all on the carbon black quality but tends to flux the refractory materials used in the furnaces. The viscosity is unimportant except from a mechanical standpoint of difficulties of pumping and spraying.

Of course, virgin crude oil fractions, or aromatic-selective solvent extracts therefrom, can be employed when they have the preferred qualities discussed above, but generally they will be found somewhat lacking in some of these preferred qualities, so that while carbon black may be made from them, they are not preferred as feedstocks for carbon black manufacture.

As an example of one preferred residual feedstock, we may employ an atomized spray of a normally liquid hydrocarbon having a hydrogen-to-carbon atomic ratio below 1.5 and preferably in the range of 0.75 to 1.25; a mean molecular weight above 140 and preferably from 225 to 550; an API gravity less than 20 and preferably less than 10; a viscosity low enough to permit handling, but usually above 30 SUS at 210° F.; and a low Conradson carbon residue, which however may be in excess of 1.5 weight percent, or even in excess of 3 weight percent.

As an example of one preferred distillate feedstock, we may employ a recycle gas oil derived from a cracking process and having an API gravity of 16 to 25, an initial boiling point of 400 to 600° F. and an end point of from 600 to 800° F. The carbon residue is generally low, such as 0.21 for example, although the carbon residue is not critical.

The invention is further illustrated by the following examples:

EXAMPLE I

Figure 2:
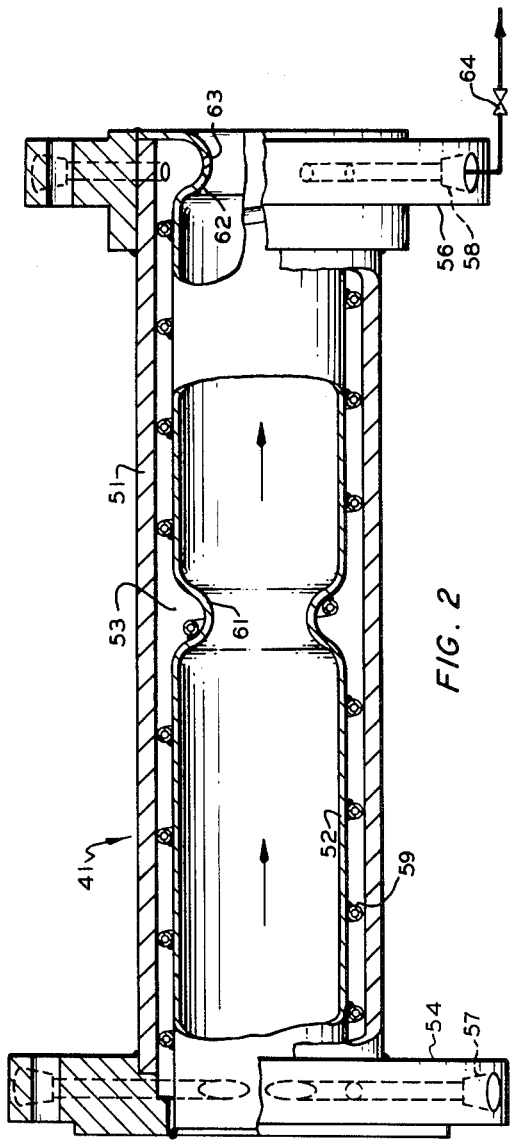
FIGURE 2 is a detailed view of a carbon black reactor.

Our invention was tested in apparatus made as shown in FIGURE 2 and FIGURE 3 in which the reactor was 1 ft. by 2 inches and the oxidizer was 2 ft. by 2 inches. This apparatus comprises a reactor 41, an inlet cyclone chamber 42, a reactor feed plate 43, reactor discharge pipe 44, oxidizer 47, tangential section 45, oxidizer feed plate 46, oxidizer 47, and discharge pipe 48.

Reactor 41 includes a cylindrical shell 51, an inner chamber wall 52, shell 51 and wall 52, together defining an annular passage 53. Inlet flange 54 and outlet flange 56 are attached to reactor 41 as shown and are provided with quench fluid inlet passages 57 and outlet passages 58, respectively. There are four inlet passages 57 drilled to enter passage 53 tangentially to cause the quench fluid to have a swirling motion, and a spiral section of tubing 59 is provided to continue the swirling motion throughout passage 53. Four outlet passages 58 are provided and these are drilled radially. Wall 52 includes a reduced diameter portion 61, thus providing a restriction or partial obstruction to the flow therethrough, and a reduced diameter portion 62 at the outlet end which is provided with quench fluid inlets 63. Preferably, a valve 64 is provided to control the flow through outlet passages 58 to thereby regulate the rate of flow of quench fluid through chamber 53. By controlling the inlet pressure of the quench fluid and by regulating the amount which flows through valve 64, the amount which is forced through quench fluid inlet 63 and the amount which is by-passed through valve 64 can be regulated to provide the desired combination of cooling of the wall 52 and the quenching of the reaction products.

In cyclone chamber 42 there is a cylindrical longitudinal passage 66, an inlet passage 67 tangential to passage 66, and a plurality of coolant passages 68. Reactor feed plate 43 is provided with four reactant inlet passages 71 and four coolant inlet passages 72, alternated at equal intervals around the circumference of feed plate 43. Coolant passages 72 communicate with an annular passage 73 in cyclone chamber 42, and passage 73 in turn communicates with each of passages 68. A feed ring 74 fits into an annular groove 76 in feed ring 43 and provides an annular feed passage 77.

Tangential section 45 is somewhat similar to cyclone chamber 42 except that coolant passages are not provided. An inlet passage 78 enters a cylindrical passage 79 tangentially. Oxidizer feed plate 46 is provided with four equally spaced inlet passages 81 and a feed ring similar to feed ring 74 in feed plate 43 to distribute the feed in an annular layer in oxidizer 47.

The construction of oxidizer 47 is substantially the same as the construction of reactor 41 except that in the apparatus utilized in these tests the oxidizer section was 2 ft. long, whereas the reactor section was 1 ft. long.

A number of carbon black runs were made using benzene as the feedstock. In a series of runs various amounts of sulfur were added to the benzene (which was essentially sulfur free in its original state) and the effect on the finished carbon black was noted. The essential data from these runs is in Table I.

Table I

CARBON BLACK RUNS 1 ft. x 2 in. Annular Fuel Feed Reactor Conditions

| | |
|---|---|
| Pressure | 15 atm. |
| Air flow rate | 1080 lb./hr. |
| Inlet air temp. | 1100° F. |
| Flow velocity | 33 ft./sec. |
| Residence time | 30 milliseconds. |
| Benzene flow rate | 210 lb./hr. |
| Mixture ratio, HC/$O_2$ | 0.84 lb./lb. |
| Quench water rate | 300 lb./hr. |

2 ft. x 2 in. Annular Air Feed Aftertreater Conditions

| | |
|---|---|
| Pressure | 15 atm. |
| Air flow rate | 360 lb./hr. |
| Inlet gas temp. | 1450° F. |
| Reaction temp. | 1900° F. |
| Flow velocity | 75 ft./sec. |
| Residence time | 27 milliseconds. |
| Over-all mixture ratio, HC/$O_2$ | 0.63 lb./lb. |

Carbon Black Characteristics

| Run No. | 1 | 2 | 3 | 4 | 5 | 6 |
|---|---|---|---|---|---|---|
| Sulfur, wt. percent | [1] 0 | [1] 0.17 | [1] 0.42 | [1] 0.84 | [2] 1.05 | [1] 1.68 |
| Photelometer | 99 | 99 | 99 | 96 | 99 | 97 |
| Acidity, pH, slurry | 8.7 | 5.2 | 4.1 | 3.9 | 2.9 | 3.0 |
| Yield, lb./gal | 1.9 | 1.6 | 1.7 | 1.9 | 1.6 | 1.8 |

[1] Carbon disulfide (calculated as elemental sulfur) added to benzene.
[2] Ditertiary butyl disulfide (calculated as elemental sulfur) added to benzene.

A run was made using as the feedstock a mixture of 75 parts by weight of essentially sulfur-free benzene and 25 parts of an $SO_2$ extract oil having the following characteristics:

| | |
|---|---|
| Gravity, API | 10.9 |
| Refractive index | 1.5898 |
| Distillation, ASTM D 86–59, ° F. | |
| IBP | 465 |
| 5% | 558 |
| 10 | 582 |
| 20 | 604 |
| 30 | 650 |
| 40 | 636 |
| 50 | 652 |
| 60 | 666 |
| 70 | 688 |
| 80 | 722 |
| 90 | 750 |
| Rec., percent | 91.0 |
| Residue, percent | 9.0 |
| Loss | 0.0 |
| Pentane insoluble, percent | 0.08 |
| Bureau of mines correlation index | 93.3 |
| Ramsbottom carbon residue, percent | 1.78 |
| Carbon content, wt. percent | 89.05 |
| Hydrogen content, wt. percent | 9.30 |
| Sulfur content, wt. percent | 1.5 |
| Water content, wt. percent | 0.0321 |
| Pour point, ° F. | 50 |
| Viscosity SUS at 100° F. | 75.86 |
| Viscosity SUS at 210° F. | 35.02 |
| BS&W | Trace |
| Aniline point | 166.4 |

This run was made with the same operating conditions as in Table I. The carbon black characteristics are in Table II.

Table II

| | |
|---|---|
| Run | 7 |
| Sulfur (present in $SO_2$ extract oil, calculated as elemental sulfur, wt. percent of mix) | 0.375 |
| Photoelometer | 99 |
| Acidity, pH, slurry | 6.7 |
| Yield, lb./gal. | 2.5 |

Another run was made using 100 percent of the above $SO_2$ extract oil as feedstock. The operating conditions and carbon black characteristics are in Table III.

Table III
CARBON BLACK RUNS

1 ft. x 2 in. Annular Fuel Feed Reactor Conditions

| | |
|---|---|
| Pressure | 15 atm. |
| Air flow rate | 1080 lb./hr. |
| Inlet air temp. | 1100° F. |
| Flow velocity | 33 ft./sec. |
| Residence time | 30 milliseconds. |
| Benzene flow rate | 200 lb./hr. |
| Mixture ratio, $HC/O_2$ | 0.81 lb./lb. |
| Over-all mixture, $HC/O_2$ | 350 lb./hr. |

2 ft. x 2 in. Annular Air Feed Aftertreater Conditions

| | |
|---|---|
| Pressure | 15 atm. |
| Air flow rate | 360 lb./hr. |
| Inlet gas temp. | 1400° F. |
| Reaction temp. | 1800° F. |
| Flow velocity | 65 ft./sec. |
| Residence time | 30 milliseconds. |
| Over-all mixture, $HC/O_2$ | 0.6 lb./lb. |

Carbon Black Characteristics

| | |
|---|---|
| Run No. | 8 |
| Sulfur, wt. percent (calc. elemental sulfur) | 1.5 |
| Photelometer | 96 |
| Acidity, pH, slurry | 3.2 |
| Yield, lb./gal. | 2.2 |

Figure 4:
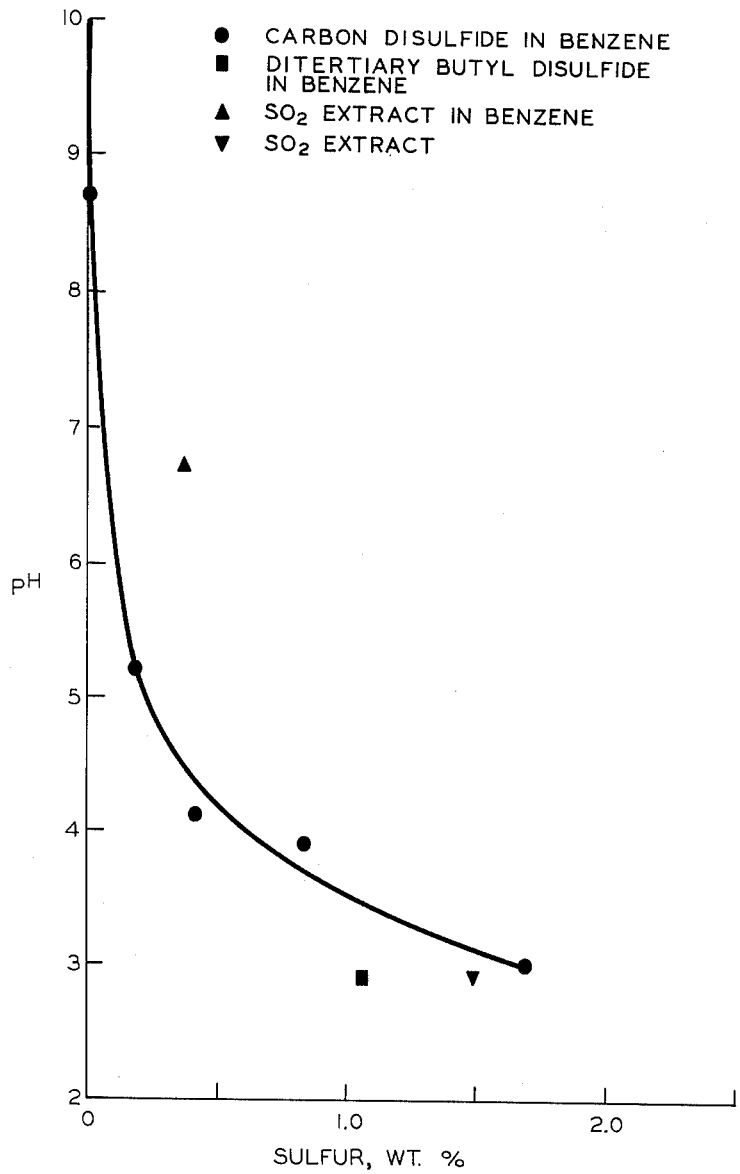
FIGURE 4 is a graph illustrating the variation in pH resulting from a variation in sulfur introduced into the reaction zone.

The results of the above runs are plotted in FIGURE 4. In this figure it is seen that the addition of about 1.0 to 1.7 weight percent sulfur to benzene achieves a result which is equivalent to an $SO_2$ extract feedstock which contains approximately the same quantity of naturally occurring sulfur. It is also seen that the effect obtained with a feed containing naturally occurring sulfur can be reduced by diluting with a sulfur free stock.

In this application the word sulfur refers to the combined or uncombined. The amount is based on elemental sulfur, but it is not implied that the sulfur must be present in uncombined form.

Reasonable variation and modification are possible within the scope of our invention which sets forth method and apparatus for controlling the pH of a furnace carbon black by controlling the amount of sulfur introduced into the reaction zone at the time of the reaction, followed by an oxidation step, improved apparatus for the production of carbon black including the control of the sulfur introduced into the reactor and an improved relatively low pH furnace carbon black.

We claim:

1. A process for producing acidic carbon black which comprises:
    continuously supplying a hydrocarbon reactant of known sulfur content to a reaction zone;
    continuously introducing at a controlled rate into said reaction zone a total amount of sulfur, including that previously present and that added to said feedstock, between about 0.1 and 3.0 parts by weight per 100 parts by weight of said hydrocarbon supplied;
    heating said hydrocarbon in said reaction zone to produce carbon black;
    partially quenching the reaction products from said reaction zone to discontinue the production of said carbon black;
    passing said partially quenched reaction product into an oxidizing zone;
    in said oxidizing zone, contacting said partially quenched reaction products with an oxygen-containing fluid oxidizing agent whereby the pH of the produced carbon black is reduced; and
    further quenching said reaction products to discontinue the reaction.

2. A process for producing acidic carbon black which comprises:
    continuously feeding a hydrocarbon reactant of known sulfur content into a reaction zone;
    continuously introducing at a controlled rate into said reaction zone a total amount of sulfur, including that previously present and that added to said feedstock, between about 0.1 and 3.0 parts by weight per 100 parts by weight of said hydrocarbon fed;
    maintaining a pressure in said zone in the range of 8 to 30 atmospheres;
    continuously adding heat to said reaction zone to maintain a temperature in the range of 2000 to 3300° F. to produce carbon black from said reactant;
    partially quenching the reaction products from said reaction zone to discontinue the production of said carbon black;
    passing said partially quenched reaction products into an oxidizing zone;
    in said oxidizing zone contacting said partially quenched reaction product with an oxygen-containing fluid oxidizing agent whereby the pH of the produced carbon black is reduced; and
    further quenching said reaction products to discontinue the reaction.

3. A process for producing acidic carbon black which comprises:
    continuously feeding a fluid hydrocarbon reactant of known sulfur content into a generally cylindrical reaction zone;
    continuously introducing at a controlled rate into said reaction zone a total amount of sulfur, including that previously present and that added to said feedstock, between about 0.1 and 3.0 parts by weight per 100 parts by weight of said hydrocarbon fed;
    passing said reactant through said zone in an annular mass adjacent the periphery of said reaction zone;
    continuously feeding a free oxygen-containing fluid oxidation agent into said zone;
    passing said oxidation agent through said zone in a rotating axial core in contact with said reactant;
    maintaining conditions of pressure, temperature, and residence time to produce carbon black from said fuel;
    partially quenching the reaction products from said reaction zone to discontinue the production of said carbon black;
    passing a stream of said partially quenched reaction products into an oxidizing zone;
    passing a stream of an oxygen-containing fluid oxidizing agent into said oxidizing zone;
    directing one of said streams as an annular, generally cylindrical, longitudinally flowing mass into said oxidizing zone;
    directing the other of said streams as a central, spirally rotating, axial core through said oxidizing zone;
    contacting said streams at the interface between said longitudinally flowing axial mass and said spirally rotating axial core whereby the pH of the produced carbon black is reduced; and
    further quenching said reaction products to discontinue the reaction.

4. A process for producing acidic carbon black which comprises:
    continuously feeding a fluid hydrocarbon reactant of known sulfur content into a generally cylindrical reaction zone;

continuously introducing at a controlled rate into said reaction zone a total amount of sulfur, including that previously present and that added to said feedstock, between about 0.1 and 3.0 parts by weight per 100 parts by weight of said hydrocarbon supplied;

passing said reactant through said zone in an annular mass adjacent the periphery of said reaction zone;

continuously feeding a free oxygen-containing fluid oxidation agent into said reaction zone;

passing said agent through said oxidation zone in a rotating axial core in contact with said reactant;

maintaining conditions of pressure, temperature, and residence time to produce carbon black from reactant in said reaction zones;

partially quenching the reaction products from said reaction zone to a temperature in the range of 800 to 1800° F.;

passing said partially quenched reaction products into a generally cylindrical oxidation zone;

continuously feeding said partially quenched reaction products into said oxidation zone in a rotating axial core;

continuously feeding an oxygen-containing fluid oxidation agent into said oxidation zone;

passing said oxidation agent through said oxidation zone in an annular mass adjacent the periphery of said oxidation zone in contact with said core whereby the pH of the produced carbon black is reduced; and further quenching said reaction products to discontinue the reaction.

5. A process for producing acidic carbon black which comprises:

continuously supplying a hydrocarbon reactant of known sulfur content to a reaction zone;

continuously introducing at a controlled rate into said reaction zone a total amount of sulfur, including that previously present and that added to said feedstock, between about 0.1 and 3.0 parts by weight per 100 parts by weight of said hydrocarbon supplied;

heating said hydrocarbon reactant in said reaction zone to produce carbon black therefrom;

partially quenching the reaction products from said reaction zone to a temperature in the range of 800 to 1800° F.;

passing said partially quenched reaction product into an oxidation zone;

in said oxidation zone, contacting said partially quenched reaction product with an oxygen-containing fluid oxidation agent whereby the pH of the produced carbon black is reduced; and further quenching said reaction products to discontinue the reaction.

6. A process for producing acidic carbon black which comprises:

continuously supplying a hydrocarbon reactant to a reaction zone;

continuously determining the sulfur content of said reactant;

continuously controlling the addition of a sulfur-containing compound and a sulfur-free hydrocarbon reactant diluent into said reactant to maintain in said reactant at the time of introduction into said reaction zone, a total amount of sulfur, including that previously present and any added, between about 0.1 and 3.0 parts by weight per 100 parts by weight of said hydrocarbon reactant supplied;

heating said hydrocarbon reactant in said reaction zone to produce carbon black;

partially quenching the reaction products from said reaction zone to discontinue the production of said carbon black;

passing said partially quenched reaction product into an oxidizing zone;

in said oxidizing zone, contacting said partially quenched reaction product with an oxygen-containing fluid oxidizing agent whereby the pH of the produced carbon black is reduced; and further quenching said reaction product to discontinue the reaction.

7. A process for producing acidic carbon black which comprises;

continuously supplying a hydrocarbon reactant to a reaction zone;

continuously determining the sulfur content of said reactant;

controlling the addition of a sulfur-containing compound into said reactant to maintain in said reactant at the time of introduction into said reaction zone a total amount of sulfur, including that previously present and that added to said reactant, between about 0.1 to 3.0 parts by weight per 100 parts by weight of said reactant supplied;

heating said hydrocarbon in said reaction zone to produce carbon black;

partially quenching the reaction products from said reaction zone to discontinue the reaction of said carbon black;

passing said partially quenched reaction product into an oxidizing zone;

in said oxidizing zone, contacting said partially quenched reaction product with an oxygen-containing fluid oxidizing agent whereby the pH of the produced carbon black is reduced; and further quenching said reaction product to discontinue the reaction.

8. In a process for producing carbon black from a fluid hydrocarbon feed of known sulfur content by subjecting it to the thermal dissociation temperature thereof in a reaction zone, and partially oxidizing the produced carbon black, the improvement which comprises:

controlling the addition of sulfur to said reaction zone to maintain in said zone a total amount of sulfur, including that previously present in said feed and that added of at least about 0.1 weight percent of said hydrocarbon feed; and intimately contacting said feed with said sulfur while said feed is being subjected to said dissociation temperature.

9. The improvement of claim 8 wherein said total amount of sulfur is in the range of 0.1 and 3.0 weight percent of said feed.

10. The improvement of claim 9 wherein said sulfur is included in said fluid hydrocarbon.

11. The improvement of claim 9 wherein said hydrocarbon is heated to dissociation temperature by hot gases supplied to the reaction zone.

12. The improvement of claim 8 wherein said total amount of sulfur is in the range of 0.5 and 1.5 weight percent of said feed.

13. In a process for making carbon black by thermal decomposition in a high temperature, carbon-forming reaction zone, from fluid hydrocarbon raw material of known sulfur content, and the subsequent partial oxidation of said carbon black, the improvement which comprises:

controlling the pH of the carbon black product by continuously introducing at a controlled rate into said carbon reaction zone, sulfur in amounts sufficient to provide a total amount of sulfur in said reaction zone, including that previously present in said raw material and that added of at least 0.1 part by weight per 100 parts by weight of said raw material supplied, said amounts of sulfur being directly associated with the pH adjustment required in said black.

14. The improvement of claim 13 wherein said total amount of sulfur is in the range of 0.5 and 1.5 parts by weight of said raw material.

15. The improvement of claim 13 wherein said total amount of sulfur is in the range of 0.1 to 3.0 parts by weight of said raw material.

16. The improvement of claim 15 wherein said sulfur is included in said fluid hydrocarbon.

References Cited by the Examiner

UNITED STATES PATENTS

| | | | |
|---|---|---|---|
| 2,144,971 | 1/1939 | Heller et al. | 23—209.8 |
| 2,631,107 | 3/1953 | Leatherman | 106—307 |
| 2,657,117 | 10/1953 | Sperberg | 23—209.6 |
| 2,682,448 | 6/1954 | Cines | 23—209.1 |
| 2,851,337 | 9/1958 | Heller | 23—209.4 |
| 2,976,128 | 3/1961 | Latham et al. | 23—209.6 |
| 3,009,784 | 11/1961 | Krejci | 23—209.4 |

FOREIGN PATENTS 455,047 3/1949 Canada.
848,419 9/1960 Great Britain.

MAURICE A. BRINDISI, *Primary Examiner.*